(12) United States Patent
Kawasaki

(10) Patent No.: US 8,355,598 B2
(45) Date of Patent: Jan. 15, 2013

(54) IMAGE PROCESSING METHOD, IMAGE PROCESSING APPARATUS, AND IMAGING APPARATUS

(75) Inventor: Toshiyuki Kawasaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 933 days.

(21) Appl. No.: 12/320,447

(22) Filed: Jan. 27, 2009

(65) Prior Publication Data

US 2009/0208136 A1    Aug. 20, 2009

(30) Foreign Application Priority Data

Feb. 14, 2008   (JP) ................................. 2008-033585
Nov. 4, 2008   (JP) ................................. 2008-282860

(51) Int. Cl.
*G06K 9/32*    (2006.01)

(52) U.S. Cl. ..................... 382/275; 382/293; 348/207.99

(58) Field of Classification Search ........................ None
See application file for complete search history.

(56) References Cited

U.S. PATENT DOCUMENTS

| | | | | |
|---|---|---|---|---|
| 5,818,527 | A * | 10/1998 | Yamaguchi et al. | 348/335 |
| 8,106,973 | B2 * | 1/2012 | Kasahara | 348/241 |
| 8,120,666 | B2 * | 2/2012 | Kasahara | 348/222.1 |
| 2004/0218813 | A1 | 11/2004 | Okada et al. | |
| 2007/0252905 | A1 * | 11/2007 | Kamiya et al. | 348/241 |

FOREIGN PATENT DOCUMENTS

| | | |
|---|---|---|
| JP | 2001-245277 | 9/2001 |
| JP | 2004-336106 | 11/2004 |
| JP | 2005-086279 | 3/2005 |
| JP | 2006-345054 | 12/2006 |
| JP | 2007-008197 | 1/2007 |

OTHER PUBLICATIONS

Kenichi Hatanaka et al., "Developement of In-Vehicle Image Processing Equipment" SEI Technical Review vol. 162, pp. 90-93, Mar. 2003.
B. Prescott et al., "Line-Based Correction of Radial Lens Distortion", *Graphical Models & Image Processing*, vol. 59, No. 1, pp. 39-47 (Jan. 1997).
European Search Report dated Apr. 29, 2009 for corresponding European Application No. 09152153.4.

* cited by examiner

*Primary Examiner* — Chan S Park
*Assistant Examiner* — Nancy Bitar
(74) *Attorney, Agent, or Firm* — Harness, Dickey & Pierce, P.L.C.

(57) ABSTRACT

A distortion of image data is corrected by performing a coordinate transformation of the image data by using $$\begin{cases} X = x + f(x - x_0, y - y_0) \\ Y = y + g(x - x_0, y - y_0) \end{cases}$$

where X and Y represent coordinates of a transformation source which is the image data after the correction of the distortion, x and y represent coordinates of a transformation destination which is the image data having the distortion, $x_0$ and $y_0$ are offset values in x direction and y direction, respectively, and f and g are correction functions.

5 Claims, 5 Drawing Sheets

G-SIGNAL

R-SIGNAL

B-SIGNAL

| 0 | -0.5 | 0 | -0.5 | 0 |
|---|---|---|---|---|
| -0.5 | 0 | -1.0 | 0 | -0.5 |
| 0 | -1.0 | 9.0 | -1.0 | 0 |
| -0.5 | 0 | -1.0 | 0 | -0.5 |
| 0 | -0.5 | 0 | -0.5 | 0 |

IMAGE PROCESSING METHOD, IMAGE PROCESSING APPARATUS, AND IMAGING APPARATUS

CROSS-REFERENCE TO RELATED APPLICATIONS

The present application claims priority to and incorporates by reference the entire contents of Japanese priority document 2008-033585 filed in Japan on Feb. 14, 2008 and Japanese priority document 2008-282860 filed in Japan on Nov. 4, 2008.

BACKGROUND OF THE INVENTION

1. Field of the Invention

The present invention relates to a technology for processing an image captured by an optical system having a wide angle and a large distortion.

2. Description of the Related Art

A vehicle is provided with a fender mirror, a door mirror, and a back mirror so that blind spots that cannot be seen directly by a driver can be seen; however, it is difficult to see the blind spots perfectly over the entire circumference of the vehicle only by these mirrors. To view the blind spots that cannot be seen even with these mirrors, developments of an on-board visual camera fitted to the front, rear, or sides of the vehicle have been underway recently (see, for example, Kenichi HATANAKA, et al., "Development of In-Vehicle Image Processing Equipment" SEI technical review, vol. 162, pp. 90-93, March 2003).

In the case of a front camera, 180 degrees or more is required as a view angle of a camera to confirm a vehicle coming from left and right at the time of approaching an intersection. Also with a rear camera, an area that a driver wishes to view is a central image of the camera at the time of moving back. Even at this time, by displaying the left and right blind spots, the vehicle can be moved back more safely. For this purpose, 180 degrees or more is required as the view angle of the camera. The side camera fitted in the fender mirror or the door mirror, or to the vicinity of the side mirror is mainly for viewing blind spots of sides of the vehicle. To continuously view a close image of front wheels or rear wheels, and a forward or rearward image thereof with the side camera from immediately below the side, a camera having a view angle of 180 degrees or more is required as well. However, with the camera having the view angle of 180 degrees or more, an image of a central part becomes small, and there are such problems that recognition of a subject becomes slower and it is difficult to gain a sense of distance. Further, as the view angle becomes wider, the distortion becomes larger, thereby making it difficult to design an optical system with a small aberration.

Accordingly, as for a camera with the view angle being 140 degrees or more, distortion correction is generally performed for correcting a distortion of the image together with image processing. However, in the case of the view angle being 180 degrees or more, it is difficult to correct the distortion completely without any sense of strangeness.

Further, in the case of a camera using a sensor having an aspect ratio of 4:3, if a stereographic projection system uses equiangular projection or the like, a vertical view angle becomes approximately 140 degrees. If the front camera is installed at the right front, or the rear camera is installed toward the right back, right under the camera is out of a light receiving area of the sensor and becomes a blind spot. An image just under the camera, that is, an image showing a bumper coming close to an obstacle such as a wall at front or rear is one of images most desired to view when the vehicle is parked. If the camera is installed downward to see the image, the most part of a screen becomes an image showing a road, and a forward image as well as a downward image becomes small.

Therefore, image processing referred to as overview transformation (viewpoint transformation) for virtually moving a position of the camera according to calculation is performed. Conventionally, when distortion correction and overview transformation are to be performed, distortion correction is performed taking into consideration a distortion amount of the circumference of the lens, and thereafter, the viewpoint transformation is performed in order to conduct the overview transformation, thereby obtaining an overview image. In this system, due to continuous processing of distortion correction and viewpoint transformation, the processing becomes very heavy, and much calculation resources are consumed.

Correction of a magnification chromatic aberration and the distortion is performed by transforming a coordinate of each pixel in an original image by using a correction formula (a formula of coordinate transformation) such as a polynomial. Conventionally, various correction formulae have been known, and a conventional general formula for correcting the distortion can be expressed as $$\begin{cases} X = x + f(x, y) \\ Y = y + g(x, y) \end{cases} \quad (1)$$

where X and Y represent coordinates of a transformation source, x and y represent coordinates of a transformation destination, and f and g are correction functions.

As shown in Equation (1), a distortion-corrected image has been heretofore obtained by performing coordinate transformation vertically and horizontally symmetrically around the center of the image. In this case, the image generally has a sense of strangeness at four corners, and when there is a subject desired to see at an upper or lower corner, a natural correction image cannot be obtained.

Further, when the distortion correction and the overview transformation are to be performed, after the distortion correction is performed, the viewpoint transformation for the overview transformation is performed separately. Accordingly, the processing becomes very heavy, and much calculation resources are required.

SUMMARY OF THE INVENTION

It is an object of the present invention to at least partially solve the problems in the conventional technology.

According to one aspect of the present invention, there is provided a method of processing image data having a distortion. The method includes correcting the distortion of the image data by performing a coordinate transformation of the image data by using $$\begin{cases} X = x + f(x - x_0, y - y_0) \\ Y = y + g(x - x_0, y - y_0) \end{cases} \quad (2)$$

where X and Y represent coordinates of a transformation source which is the image data after the correction of the distortion, x and y represent coordinates of a transformation destination which is the image data having the distortion, $x_0$ and $y_0$ are offset values in x direction and y direction, respectively, and f and g are correction functions.

Furthermore, the offset values can be set as $x_0 \neq 0$ and $y_0=0$, so that an offsetting is performed only in the x-direction.

Moreover, the offset values can be set as $x_0=0$ and $y_0 \neq 0$, so that an offsetting is performed only in the y-direction.

Furthermore, the offset values $x_0$ and $y_0$ can be set such that a fixed point in correcting the distortion is offset from the center.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. The embodiments explain an imaging apparatus that captures a subject by using an optical system having a large chromatic aberration of magnification and distortion with a wide angle, and an image processing system has a configuration to correct the chromatic aberration of magnification and the distortion. However, the main characteristic of the present invention is the distortion correction with the overview transformation (viewpoint transformation), and the image needs to be an image captured by the optical system having at least wide angle and large chromatic aberration of magnification. While color components of the image are red (R), green (G), and blue (B) of an additive primary colors, they can be yellow (Y), magenta (M), and cyan (C) of a subtractive primary colors.

Figure 1:
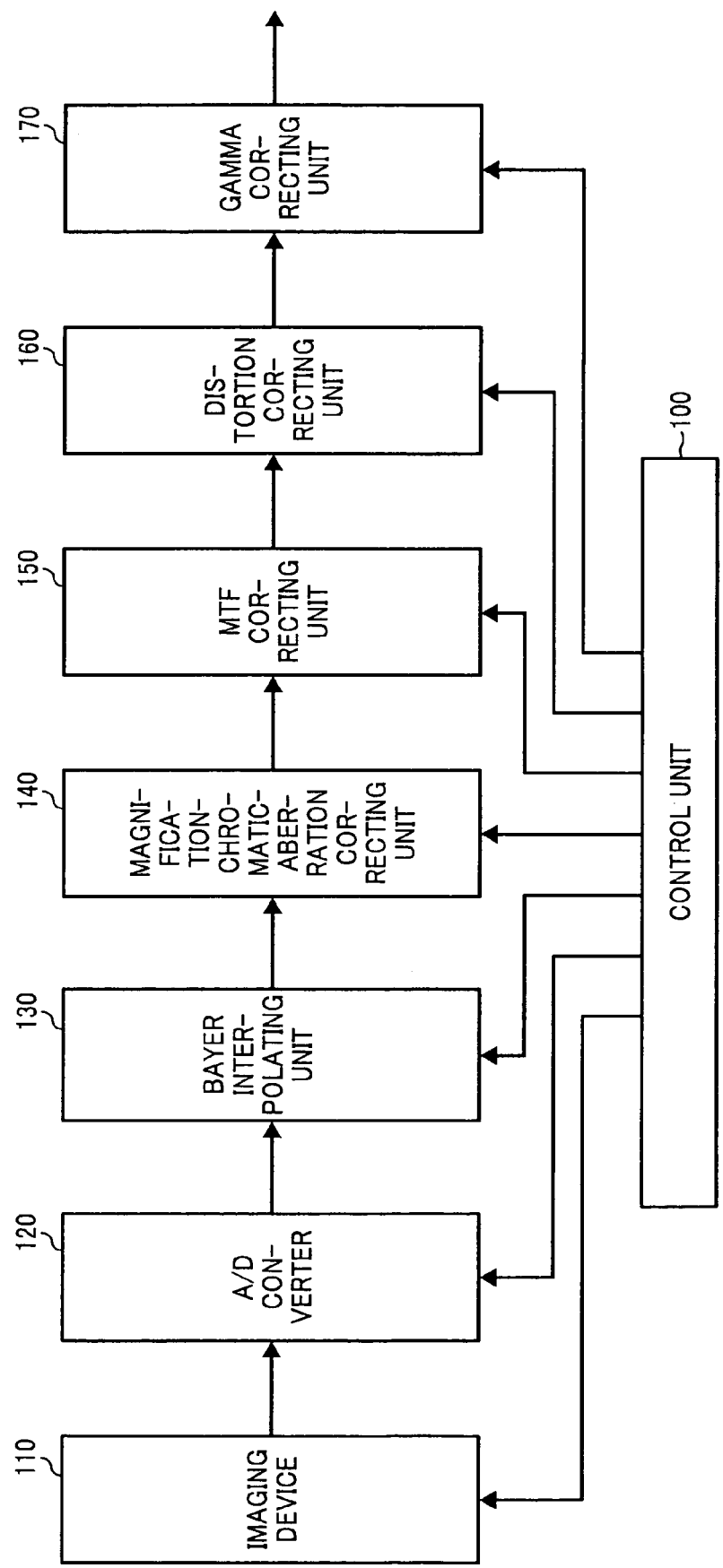
FIG. 1 is a block diagram of an imaging apparatus according to an embodiment of the present invention.

FIG. 1 is a functional block diagram of an image processing system in an imaging apparatus according to an embodiment of the present invention. In addition to the components shown in FIG. 1, the imaging apparatus according to the embodiment includes an operating unit, an image storage unit, and an image display unit, which are not shown in FIG. 1. The imaging apparatus is used as a vehicle on-board camera, but it is not the only application that limits the present invention. For example, the imaging apparatus can be installed and used at supermarkets or convenience stores.

As shown in FIG. 1, a control unit 100 provides required control signals (clock, horizontal/vertical synchronization signal, and the like) to respective units to control the operation of the units in a pipelined manner.

An imaging device 110 includes, for example, a CCD or CMOS sensor for converting an optical image captured using the optical system (not shown) such as a fisheye optical system having a wide angle and large chromatic aberration of magnification and distortion into an electric signal (image data). A Bayer color filter array is provided in the imaging device 110, and Bayer-arrayed RGB image data is sequentially output based on coordinate value (x, y) given from the control unit 100. The control unit 100 gives the coordinate value (x, y) given to the imaging device 110 to a subsequent stage sequentially by shifting a predetermined time. The coordinate value (x, y) can be generated in the imaging device 110 and sequentially given to the subsequent stage.

An analog-to-digital (A/D) converter 120 converts the Bayer-arrayed RGB image data, which is an analog signal output from the imaging device 110, into a digital signal and outputs the digital signal to a Bayer interpolating unit 130. The digital signal, for example, includes 8 bits for each of RGB. Generally, an AGC circuit is provided at a previous stage of the A/D converter 120; however, it is omitted here.

The Bayer interpolating unit 130 receives the Bayer-arrayed RGB image data, which is converted into the digital signal, generates image data of entire coordinate positions by a linear interpolation, and outputs the image data to a magnification-chromatic-aberration correcting unit 140.

Figure 2A:
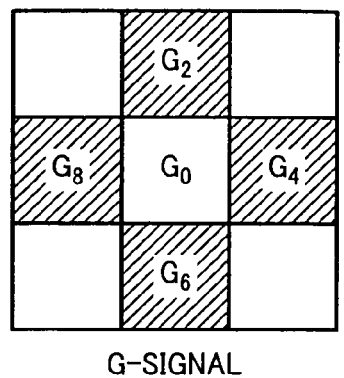
FIG. 2A is a schematic diagram of a Bayer color filter array for a G-signal.
Figure 2B:
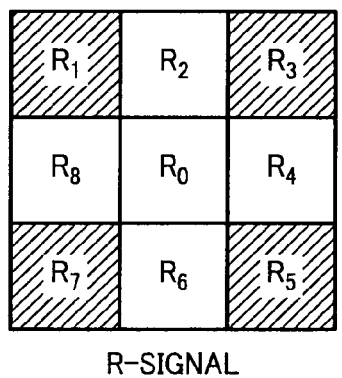
FIG. 2B is a schematic diagram of the Bayer color filter array for an R-signal.
Figure 2C:
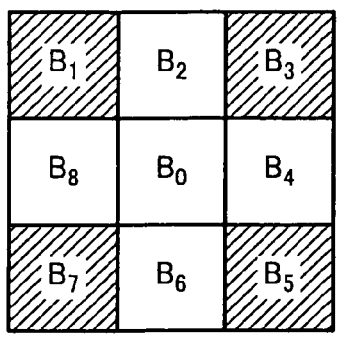
FIG. 2C is a schematic diagram of the Bayer color filter array for a B-signal.

FIGS. 2A to 2C are schematic diagrams of the Bayer color filter array, where $G_0$, $R_2$, $R_4$, $R_6$, $R_8$, and $R_0$ are obtained by Equations (3) to (8).

$$G_0=(G_2+G_4+G_6+G_8)/4 \qquad (3)$$

$$R_2=(R_1+R_3)/2 \qquad (4)$$

$$R_4=(R_3+R_5)/2 \qquad (5)$$

$$R_6=(R_5+R_7)/2 \qquad (6)$$

$$R_8=(R_1+R_7)/2 \qquad (7)$$

$$R_0=(R_1+R_3+R_5+R_7)/4 \qquad (8)$$

$B_2$, $B_4$, $B_6$, $B_8$, and $B_0$ are the same as the case of $R_2$, $R_4$, $R_6$, $R_8$, and $R_0$.

Although the embodiment deals with an imaging device employing the Bayer color filter array, the effect can be obtained for an imaging device employing other type of color filter array of CMYG array or RGB+Ir (infrared). Particularly, the imaging device having a color filter array of four colors requires a low latency memory or a 4-port RAM, expecting a high effect, compared to a three-color type such as RGB.

The magnification-chromatic-aberration correcting unit 140 receives Bayer-interpolated RGB image data, performs coordinate transformation (chromatic aberration of magnification coordinate transformation) individually with respect to the color components of RGB according to a predetermined equation, and outputs the chromatic aberration of magnification-corrected RGB image data. A low-capacity and low-latency memory or a low-capacity memory having a plurality of ports (such as an SRAM) can be used for the coordinate transformation for correction of the chromatic aberration of magnification.

A modulation-transfer-function (MTF) correcting unit 150 receives the chromatic aberration of magnification-corrected RGB image data, performs MTF correction using an FIR file, and outputs the MTF-corrected RGB image data.

Figures 3, 4:
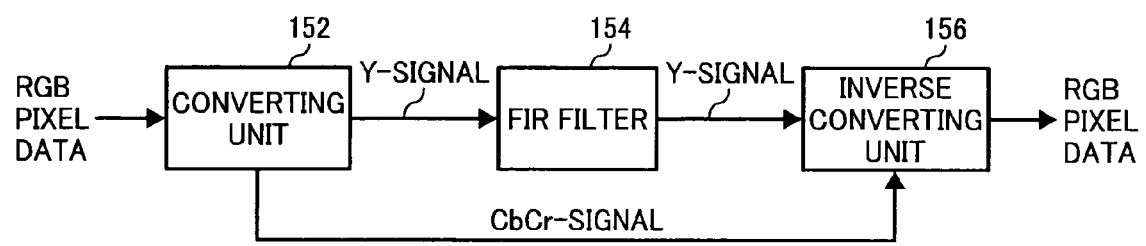
FIG. 3 is a block diagram of an MTF correcting unit according to the embodiment.
FIG. 4 is a schematic diagram for illustrating an example of an FIR filter.

FIG. 3 is a block diagram of the MTF correcting unit 150. A converting unit 152 converts RGB image data into YCbCr image data based on Equations (9) to (11).

$$Y=0.299R+0.587G+0.114B \qquad (9)$$

$$Cr=0.500R-0.419G-0.081B \qquad (10)$$

$$Cb=-0.169R-0.332G+0.500B \qquad (11)$$

An FIR filter (5×5 filter) 154 receives only a luminance signal Y of YCbCr, and performs predetermined MTF correction. A high quality image with amplification of color noise being suppressed can be obtained by filtering (performing MTF correction) only to the Y-signal. FIG. 4 is a schematic diagram for illustrating an example of the FIR filter. Because the Y-signal is filtered, the MTF correction needs to be performed after the correction of the chromatic aberration of magnification. However, when the MTF correction is performed after the distortion correction, the transformation distance in the coordinate transformation is large in the distortion correction and an arithmetic error easily occurs, as described below. The MTF correction is preferably performed at a subsequent stage of correction of the chromatic aberration of magnification and at a previous stage of the distortion correction as in the present embodiment, to avoid that the error is amplified by the MTF correction to adversely affect the image quality.

An inverse converting unit 156 receives the CbCr-signal and the MTF-corrected Y-signal, and outputs inverse-converted RGB image data based on Equations (12) to (14).

$$R=Y+1.402Cr \qquad (12)$$

$$G=Y-0.714Cr-0.344Cb \qquad (13)$$

$$B=Y+1.772Cb \qquad (14)$$

A distortion correcting unit 160 inputs the magnification chromatic aberration-corrected and MTF-corrected RGB image data, to perform the coordinate transformation commonly to the respective color components of RGB according to Equation (2), and outputs the RGB image data subjected to the overview transformation (viewpoint transformation) as well as the distortion correction. The coordinate transformation for correcting the distortion generally requires large memory capacity as compared with the memory for correcting the magnification chromatic aberration; however, because a 1-port memory can be used, a high-latency memory (dynamic random access memory (DRAM) or the like) can be used. The configuration and operations of the distortion correcting unit 160 will be described later.

A gamma correcting unit 170 receives the RGB image data output from the distortion correcting unit 160, performs predetermined gamma correction by using respective lookup tables or the like of RGB, and outputs the gamma-corrected RGB image data. The RGB image data from the gamma correcting unit 170 is transmitted to a display unit (not shown) and displayed on a monitor.

The overall operation of the present embodiment shown in FIG. 1 is as explained above. The distortion correcting unit 160 is described in detail below.

Figure 5:
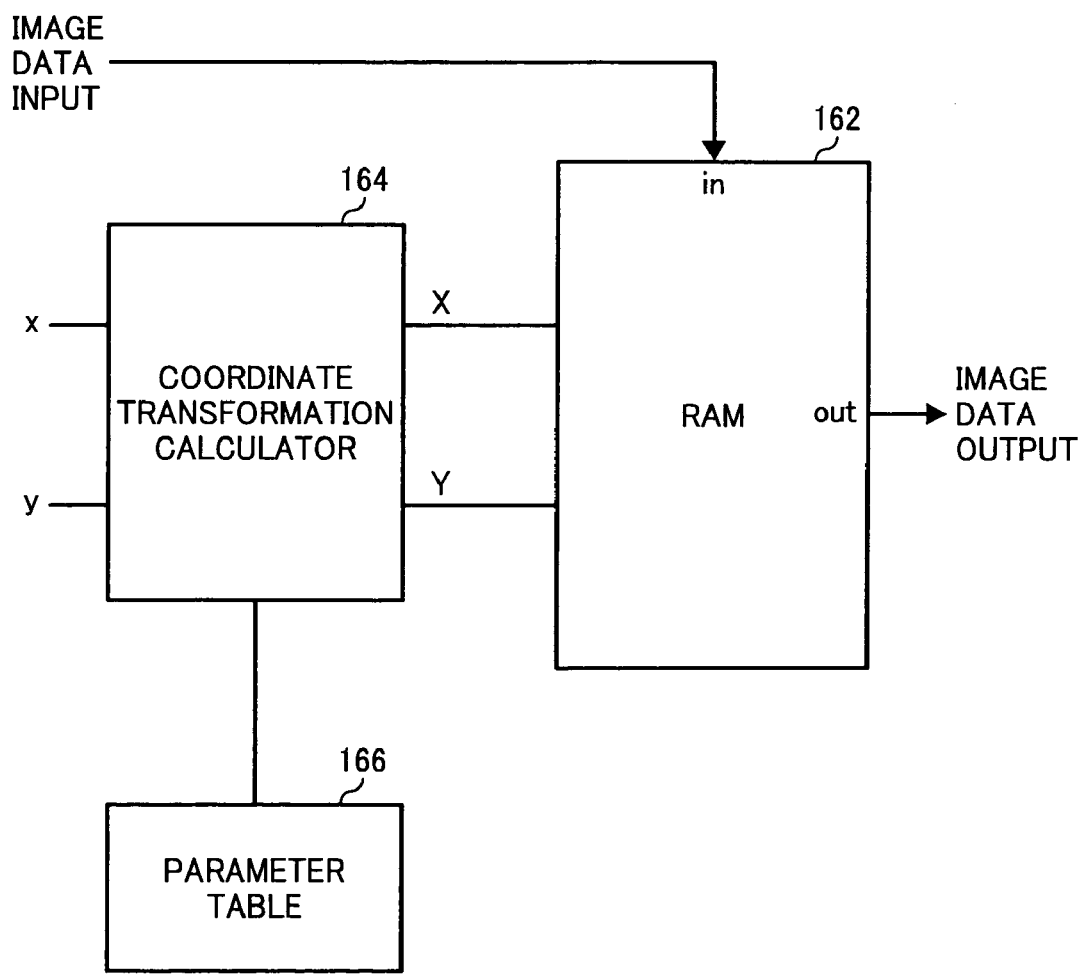
FIG. 5 is a configuration diagram of a distortion correcting unit according to the embodiment shown in FIG. 1.

FIG. 5 is a configuration diagram of the distortion correcting unit 160 according to the embodiment. In the present embodiment, it is assumed that Equation (15) is used for the correction formula of the distortion (the formula of coordinate transformation). However, Equation (2) can be generally used.

$$\begin{cases} X = x + [a(1) + a(2)|x| + a(3)|y - y_0| + a(4)(y - y_0)^2]x \\ Y = y + [b(1) + b(2)|y - y_0| + b(3)|x| + b(4)x^2](y - y_0) \end{cases} \qquad (15)$$

where X, Y denotes a coordinate of the source, x, y denotes a coordinate of the destination, $y_0$ denotes an offset value in the y direction (vertical direction), and a(1) to a(4) and b(1) to b(4) denote coordinate transformation coefficients.

According to Equation (15), a distortion-corrected image can be obtained by performing coordinate transformation vertically asymmetrically with respect to the original image having the distortion. For example, if a focal point is set slightly upward, the area of the lower part increases, and when the subject that a driver wishes to view is in the lower part, the subject can be viewed clearly. If the focal point is set slightly downward, the image can be seen naturally.

In FIG. 5, reference numeral 162 denotes a coordinate transformation memory such as a RAM, 164 denotes a coordinate transformation calculator that calculates transformation coordinate for correcting the magnification chromatic aberration according to Equation (15), 166 denotes a parameter table for holding coordinate transformation coefficients and parameters of the offset value used for the correction formula. The coordinate transformation coefficients and the offset values in the parameter table 166 can be arbitrarily changed from outside.

The RGB image data (original data) with the distortion being uncorrected is sequentially written in the coordinate transformation memory 162 from the top line according to the coordinate value (x, y). On the other hand, the coordinate transformation calculator 164 inputs the coordinate value (x, y), which is the coordinate of the destination, obtains the required coordinate transformation coefficient and offset value from the parameter table 166 to calculate Equation (15), and outputs a coordinate value (X, Y) as the coordinate of the source.

The RGB image data is sequentially read from the coordinate transformation memory 162 based on the coordinate value (X, Y) output from the coordinate transformation calculator 164, parallel to the write operation of the RGB image data based on the coordinate value (x, y) (to be precise, delayed for a predetermined time). That is, a pixel value of the pixel at the coordinate (X, Y) is read as the pixel value of the pixel at the coordinate (x, y) from the coordinate transformation memory 162, and ultimately the distortion-corrected RGB image data is output.

As described above, the distortion-corrected image that is coordinate-transformed vertically asymmetrically can be obtained by Equation (15) as the correction formula. That is, the same effect as that obtained by the overview transformation (viewpoint transformation) can be obtained. The user sees a monitor image on the display unit (not shown) to change the parameter value $y_0$ in the parameter table 166 as required, thereby enabling to arbitrarily change a rate of vertical asymmetry.

Figure 6A:
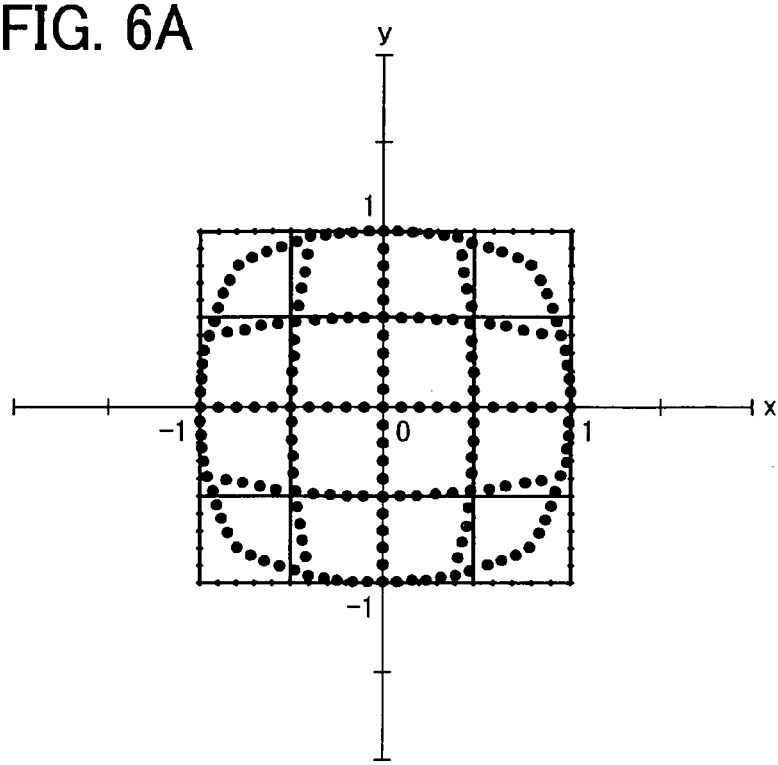
FIGS. 6A and 6B are specific examples of distortion correction according to the present invention and a conventional technique.
Figure 6B:
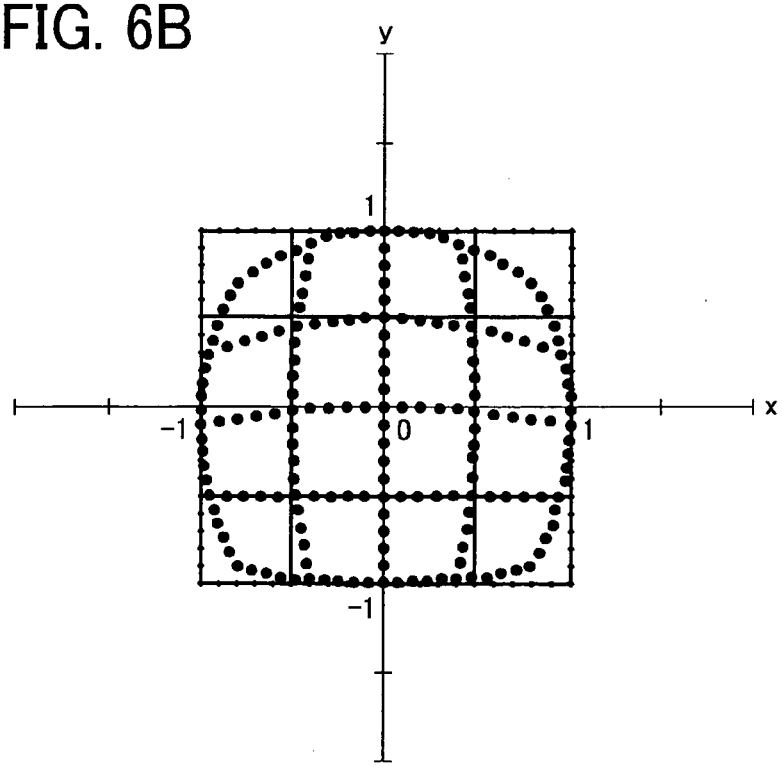

FIGS. 6A and 6B are specific examples of distortion correction according to the present invention and a conventional technique. FIG. 6A is an example when a conventional correction formula is used, and FIG. 6B is an example when Equation (15) according to the present embodiment is used, where a frame surrounded by dotted line indicates an image before correction and a frame surrounded by solid line indicates an image after correction. In FIG. 6B, transformation coefficients a(1) to a(4) and the offset value $y_0$ are represented by $$\begin{bmatrix} a(1) & a(2) & a(3) & a(4) \\ b(1) & b(2) & b(3) & b(4) \end{bmatrix} = \begin{bmatrix} 0 & 0 & 0 & -0.2 \\ 0 & 0 & 0 & -0.2 \end{bmatrix}$$

$$Y_0 = 0.5$$

The display range is X=−1 to 1 and Y=−1 to 1.

FIG. 6A indicates that an image with the distortion is subjected to the coordinate transformation vertically and horizontally symmetrically, around the center (0, 0) of the image to obtain a distortion-corrected image. On the other hand, in FIG. 6B, the image with the distortion is subjected to the coordinate transformation vertically asymmetrically, around (0, −0.5) to obtain a distortion-corrected and viewpoint-transformed image. In FIG. 6B, magnification on the lower part can be decreased to increase the upper part without any sense of strangeness, and the same effect as that when the viewpoint is raised can be obtained. Similarly, for example, by setting $y_0=-0.5$, the same effect as that when the viewpoint is lowered can be obtained. Generally, a desired correction image can be obtained without any sense of strangeness by performing coordinate transformation at least vertically or horizontally asymmetrically according to Equation (2).

According to one aspect of the present invention, the original image with the distortion is corrected by performing the coordinate transformation at least vertically or horizontally asymmetrically, thereby enabling to obtain a corrected image without any sense of strangeness, such that a subject that that a driver wishes to view can be seen naturally. For example, when the subject that the driver wishes to view is at the lower corner, by performing offsetting vertically to distort the upper corner, the subject at the lower corner can be seen naturally. Further, by performing offsetting horizontally, adjustment becomes possible in the case that the installation position of the camera is not at the center, and a level of recognition of a moving object from left or right can be improved.

Further, by performing the processing shown in Equation (2), even when the camera is installed at a relatively lower position of a vehicle body such as the front camera, a point of view can be raised by performing a simple viewpoint transformation, and an image of the front side can be obtained without any sense of strangeness. Because overview transformation is not required after the distortion correction, the same effect as that of the viewpoint transformation can be obtained with very light processing. When the camera is installed slightly downward to view just under the front camera, the most part of the screen displays a road surface. However, by Equation (2), magnification of the upper part and the lower part of the screen can be changed. Therefore, magnification of the lower part can be decreased to increase the upper part without any sense of strangeness, thereby enabling to display a clear view with no sense of strangeness as a whole with a large image of the front side.

In the case of the rear camera, the camera may be fitted above a rear window, and the point of view becomes high in this case. However, by simply performing correction with Equation (2), the point of view can be lowered, and an image of the rear side can be obtained without any sense of strangeness. Because the overview transformation is not required after the distortion correction, the same effect as that of the viewpoint transformation can be obtained with very light processing.

Further, in the case of the side camera, even if the camera is installed downward, an image with no sense of strangeness toward the front or back can be obtained. Because the overview transformation is not required after the distortion correction, the same effect as that of the viewpoint transformation can be obtained with very light processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of processing image data having a distortion, the method comprising:
correcting the distortion of the image data by performing a coordinate transformation asymmetrically of the image data and shifting away from a center by an offset by using $X = x + f(x-xo, Y-Yo)$ $Y = Y + g(X-Xo, Y-Yo)$ where X and Y represent coordinates of a transformation source which is the image data after the correction of the distortion, x and y represent coordinates of a transformation destination which is the image data having the distortion, x0 and y0 are offset values in x direction and y direction, respectively, and f and g are correction functions, wherein at least one of x0 and yo is not equal to zero, and the method is performed using a computer or processor.

2. The method according to claim 1, wherein the offset values $x_0$ and $y_0$ are set such that a fixed point in the distortion correction is offset from a center.

3. An image processing apparatus that processes image data having a distortion, the image processing apparatus comprising a distortion correcting unit that corrects the distortion of the image data by performing a coordinate transformation asymmetrically of the image data and shifting away from a center by an offset by using $X = x + f(x-xo, Y-Yo)$ $Y = Y + g(X-Xo, Y-Yo)$ where X and Y represent coordinates of a transformation source which is the image data after the correction of the distortion, x and y represent coordinates of a transformation destination which is the image data having the distortion, xo and y0 are offset values in x direction and y direction, respectively, at least one of x0 and y0 is not equal to zero, and f and g are correction functions.

4. The image processing apparatus according to claim 3, wherein the distortion correcting unit sets the offset values $x_0$ and $y_0$ such that a fixed point in the distortion correction is offset from a center.

5. An imaging apparatus comprising:
an optical system having a wide angle and a large distortion
an imaging device that captures an image using the optical system and outputs image data including the distortion; and an image processing apparatus that processes the image data output from the imaging device, wherein
the image processing apparatus includes a distortion correcting unit that corrects the distortion of the image data by performing a coordinate transformation asymmetrically of the image data and shifting away from a center by an offset by using $X = x + f(x31\ xo, Y-Yo)$ $Y = Y + g(X-Xo, Y-Yo)$ where X and Y represent coordinates of a transformation source which is the image data after the correction of the distortion, x and y represent coordinates of a transformation destination which is the image data having the distortion, xo and y0 are offset values in x direction and y direction, respectively, at least one of x0 and Y0 is not equal to zero, and f and g are correction functions.

* * * * *